United States Patent
Lee et al.

(10) Patent No.: US 12,068,652 B2
(45) Date of Patent: Aug. 20, 2024

(54) COIL ASSEMBLY OF SLOTLESS MOTOR, HOUSING AND SLOTLESS MOTOR INCLUDING THE SAME

(71) Applicant: IUCF-HYU (Industry-University Cooperation Foundation Hanyang University), Seoul (KR)

(72) Inventors: Ju Lee, Seoul (KR); Seung Heon Lee, Yongin-si (KR); Sung Hong Won, Seongnam-si (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 417 days.

(21) Appl. No.: 17/438,087

(22) PCT Filed: Feb. 19, 2020

(86) PCT No.: PCT/KR2020/002396
§ 371 (c)(1),
(2) Date: Sep. 10, 2021

(87) PCT Pub. No.: WO2020/184860
PCT Pub. Date: Sep. 17, 2020

(65) Prior Publication Data
US 2022/0190665 A1 Jun. 16, 2022

(30) Foreign Application Priority Data
Mar. 12, 2019 (KR) .......................... 10-2019-0027880

(51) Int. Cl.
*H02K 3/28* (2006.01)
*H02K 3/47* (2006.01)

(52) U.S. Cl.
CPC ................. *H02K 3/28* (2013.01); *H02K 3/47* (2013.01)

(58) Field of Classification Search
CPC ................................... H02K 3/28; H02K 3/47
See application file for complete search history.

(56) References Cited

U.S. PATENT DOCUMENTS

| | | | | |
|---|---|---|---|---|
| 3,079,519 A * | 2/1963 | Kitson, Jr. | ................ | H02K 3/44 29/605 |
| 6,894,418 B2 * | 5/2005 | Jones | ........................ | H02K 3/04 310/179 |

(Continued)

FOREIGN PATENT DOCUMENTS

| | | |
|---|---|---|
| JP | 2014-068460 A | 4/2014 |
| JP | 2015-167464 A | 9/2015 |

(Continued)

*Primary Examiner* — Eric Johnson
(74) *Attorney, Agent, or Firm* — NKL LAW; Jae Youn Kim

(57) ABSTRACT

Disclosed are a coil assembly of a slotless motor, a housing, and a slotless motor including the same. According to the present invention, there is provided a coil assembly of a slotless motor which includes a plurality of first coil structures which have two first coil sides facing each other with a first space interposed therebetween and having a fan-shaped cross section in a width direction and have a first end turn bent in a first direction on at least one end in a longitudinal direction of the two first coil sides and a plurality of second coil structures which have two second coil sides facing each other with a second space interposed therebetween and having a fan-shaped cross section in a width direction and have a second end turn bent in a second direction on at least one end in a longitudinal direction of the two second coil sides, wherein the plurality of first coil (Continued)

structures and the plurality of second coil structures are coupled to each other to form a circular stator winding structure.

8 Claims, 8 Drawing Sheets

(56) References Cited

U.S. PATENT DOCUMENTS

| | | | | |
|---|---|---|---|---|
| 7,619,345 | B2* | 11/2009 | Kalsi | H02K 3/24 |
| | | | | 310/206 |
| 8,629,596 | B2* | 1/2014 | Germishuizen | H02K 15/0037 |
| | | | | 310/260 |
| 9,590,479 | B2* | 3/2017 | Tsuge | H02K 15/066 |
| 10,992,202 | B2* | 4/2021 | Lee | H02K 3/04 |

FOREIGN PATENT DOCUMENTS

| | | |
|---|---|---|
| JP | 2017-050949 A | 3/2017 |
| JP | 2018-011389 A | 1/2018 |
| KR | 10-2018-0060757 A | 6/2018 |

\* cited by examiner

COIL ASSEMBLY OF SLOTLESS MOTOR, HOUSING AND SLOTLESS MOTOR INCLUDING THE SAME

BACKGROUND

(a) Technical Field

The present invention relates to a coil assembly of a slotless motor, a housing, and a slotless motor including the same.

(b) Background Art

In a general motor, a stator has a slot which is a portion wound with an armature coil and teeth made of an iron core to serve as a passage of a magnetic flux generated in the armature coil. This slot structure maximizes permeance to obtain a high gap flux density, but the occurrence of cogging torque is inevitable.

In addition, the slotless structure, also referred to as a coreless structure, is a structure without a slot and generates very constant torque without cogging torque. Therefore, since the slotless structure is excellent in the noise and vibration aspects and the amount of iron core is greatly reduced, the iron loss is low and a mechanical time constant is small to have good controllability.

However, since a winding of such a slotless motor has an air-core structure that is not wound on the iron core and only the form of coil itself needs to be coupled to the stator, producibility is deteriorated as compared with a core type motor.

FIGS. 1 to 3 are diagrams illustrating a winding structure of a slotless motor according to the related art.

FIG. 1 is a winding structure of a slotless motor constituted by a loop tile method. That is, in the winding structure of FIG. 1, many coils are overlapped to engage with each other by varying heights of two coil sides constituting one turn.

Thus, in the winding structure of FIG. 1, there is no change in the gaps when the coils are connected along the circumference of the stator, and while the coils engage with each other, the fixation is easy and it is advantageous in terms of the manufacturing.

However, in the winding structure of FIG. 1, there is a problem that when many turns of coil is made, it is difficult to be manufactured to have a difference in heights of both coil sides.

Further, when many coils are not formed in the same shapes, the coils engage with each other and thus, there is a difficulty in manufacturing even in connecting the winding, and when there is a difference in the shape of the coil forming each phase, there is a problem that phase unbalance may occur.

Then, the winding structure shown in FIG. 2 is formed by stacking many coils to be spaced at constant distances along a circumferential direction of the stator and portions of the coils with increased thicknesses while the coils are stacked to be in contact with each other are compressed to minimize an effective gap length.

However, in the winding structure of FIG. 2, there is a problem that it is difficult to be manufactured by stacking the coils at constant intervals. Particularly, the winding structure of FIG. 2 is to minimize a gap length by compressing the portions where the coils are overlapped with each other, and as compared with a state in which the portions are compressed and not overlapped with each other, there is a problem in that the effective gap length is increased and there is a high possibility that the gaps are ununiform depending on the level of manufacturing technology.

In addition, in the winding structure illustrated in FIG. 3, the coils are disposed to face each other and both ends of a coil having a small horizontal width is overlapped with the insides of both ends of a coil having a large horizontal width.

However, even in the winding structure of FIG. 3, the effective gap length varies at the portions where the coils overlap each other, and as a result, there is a problem that there may be a difference in inductance of each coil and a process of fixing the coils by facing each other one by one is inconvenient.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

In order to solve the problems of the related art, an object of the present invention is to provide a coil assembly of a slotless motor having the same effective gap length even at any place, a housing, and a slotless motor including the same.

According to an aspect of the present invention, there is provided a coil assembly of a slotless motor which includes a plurality of first coil structures which have two first coil sides facing each other with a first space interposed therebetween and having a fan-shaped cross section in a width direction and have a first end turn bent in a first direction on at least one end in a longitudinal direction of the two first coil sides and a plurality of second coil structures which have two second coil sides facing each other with a second space interposed therebetween and having a fan-shaped cross section in a width direction and have a second end turn bent in a second direction on at least one end in a longitudinal direction of the two second coil sides, wherein the plurality of first coil structures and the plurality of second coil structures are coupled to each other to form a circular stator winding structure.

During coupling for forming the circular stator winding structure, first end turns of the plurality of first coil structures and second end turns of the plurality of second coil structures may be disposed in opposite directions to each other.

During coupling for forming the circular stator winding structure, the plurality of first coil structures may be located inside and the plurality of second coil structures may be disposed at the outside of the plurality of first coil structures while surrounding the plurality of first coil structures.

The first coil sides and the second coil sides may have the same radius in a concentric direction, wherein an outer radius of the first end turn may be the same as inner radii of the first and second coil sides and an inner radius of the second end turn may be formed the same as the outer radii of the first and second coil sides.

The second end turn of the plurality of second coil structures may have inclined portions in a symmetrical form at both ends and when different second coil structures are coupled to each other to form the circular stator winding structure, a notch may be formed by the inclined portions in the symmetrical form.

After forming the circular stator winding structure, a housing may be coupled to at least one of the upper and lower portions of the plurality of second coil structures.

The housing may have a plurality of protrusions which are coupled to a plurality of notches formed by the plurality of second coil structures.

The plurality of first coil structures and second coil structures may have coil mold structures.

At the other end facing the second end turn of the plurality of second coil structures, a third end turn having the same radius as the second coil sides may be provided, second inclined portions in a symmetrical form may be formed at both ends of the third end turn, and when different second coil structures are coupled to each other to form the circular winding structure, a notch may be formed by the second inclined portions in the symmetrical form.

According to another aspect of the present invention, there is provided a slotless motor comprising the coil assembly.

According to yet another aspect of the present invention, there is provided a coil assembly housing of a slotless motor including a main body; and a plurality of protrusions formed on one surface of the main body, wherein the plurality of protrusions are coupled to a plurality of notches formed by coupling of a plurality of coil structures constituting the coil assembly of the slotless motor, and the coil assembly of the slotless motor includes a plurality of first coil structures which have two first coil sides facing each other with a first space interposed therebetween and having a fan-shaped cross section in a width direction and have a first end turn bent in a first direction on at least one end in a longitudinal direction of the two first coil sides and a plurality of second coil structures which have two second coil sides facing each other with a second space interposed therebetween and having a fan-shaped cross section in a width direction and have a second end turn bent in a second direction on at least one end in a longitudinal direction of the two second coil sides, wherein the plurality of first coil structures and the plurality of second coil structures are coupled to each other to form a circular stator winding structure.

According to the present invention, there is an advantage that an effective gap length is the same even at any place and there is no deterioration of the output even while the effective gap length is increased.

Further, according to the present invention, there is an advantage that a possibility that phase unbalance occurs is reduced, the structure is very simplified, and it is advantageous even in manufacturing.

It should be understood that the effects of the present invention are not limited to the effects described above, but include all effects that can be deduced from the detailed description of the present invention or configurations of the invention described in appended claims.

DETAILED DESCRIPTION

Figure 1:
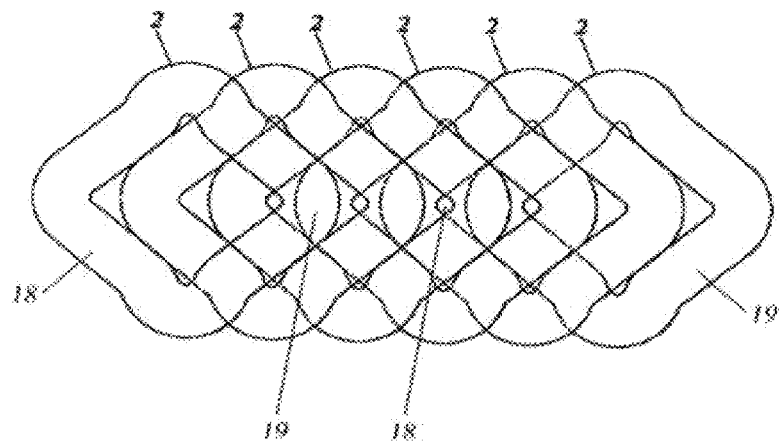
FIGS. 1 to 3 are diagrams illustrating a winding structure of a slotless motor according to the related art.
Figure 2:
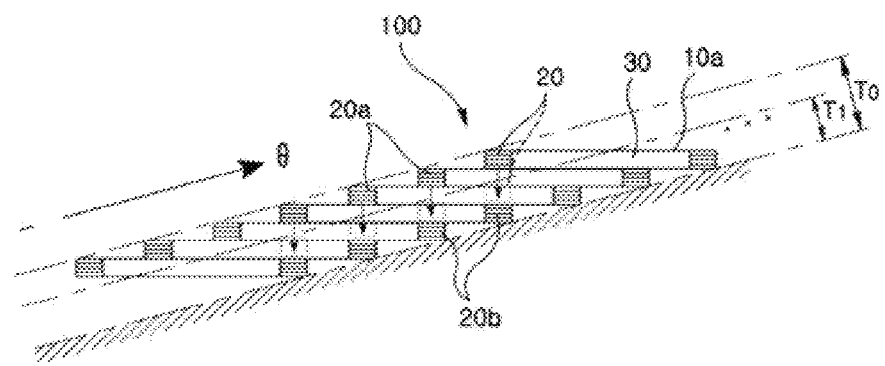
Figure 3:
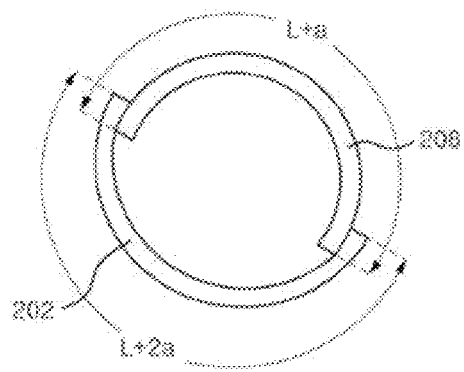

The present invention may have various modifications and various embodiments and specific embodiments will be illustrated in the drawings and will be described in detail.

However, the present invention is not limited to specific embodiments, and it should be understood that the present invention covers all modifications, equivalents and replacements included within the idea and technical scope of the present invention.

The present invention provides a coil assembly of a slotless motor capable of forming a circular stator winding inner portion using an air-core winding structure which is located at each of the inside and the outside.

Figure 4:
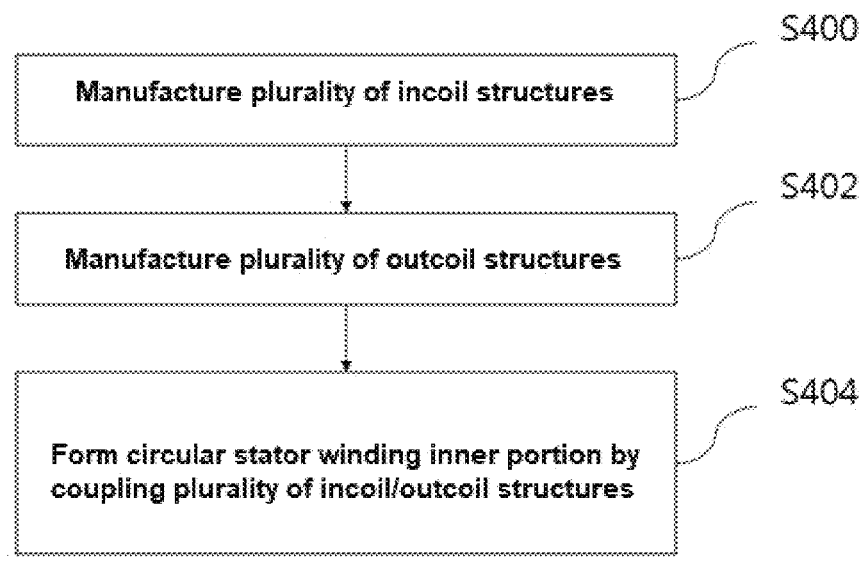
FIG. 4 is a diagram illustrating a process of forming a circular stator winding inner portion of a coil assembly of a slotless motor according to an embodiment of the present invention.

FIG. 4 is a diagram illustrating a process of forming a circular stator winding inner portion of a coil assembly of a slotless motor according to an embodiment of the present invention.

Referring to FIG. 4, when forming a circular winding structure, a plurality of incoil structures (first coil structures) located inside is manufactured (step 400) and a plurality of outcoil structures (second coil structures) located outside together therewith is manufactured (step 402).

Thereafter, the plurality of incoil structures are disposed inside and the plurality of outcoil structures are disposed outside to form a circular stator winding inner portion (step 404).

Figure 5:
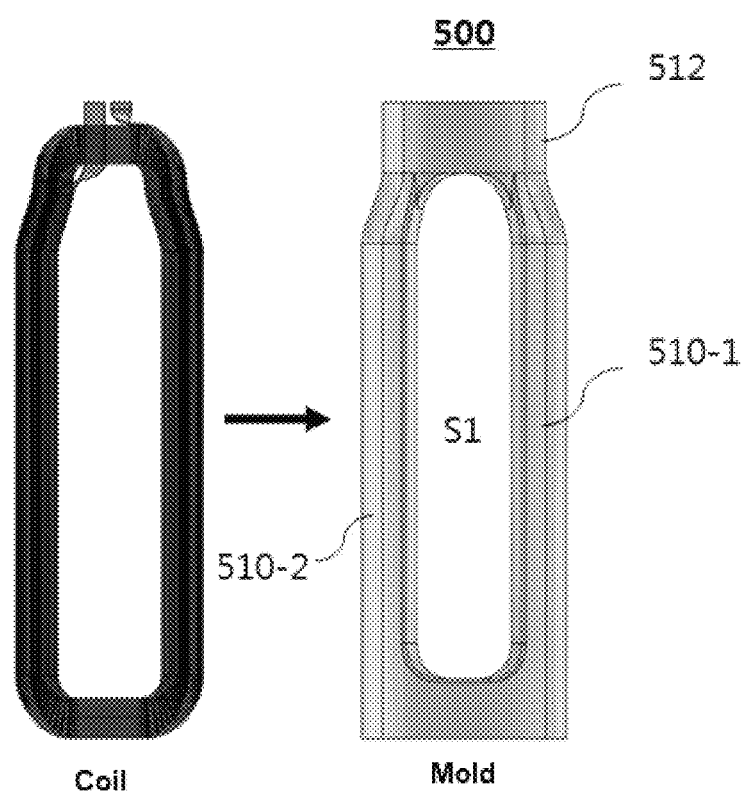
FIG. 5 is a diagram illustrating a manufacturing process of an individual incoil structure according to the present embodiment.
Figure 6:
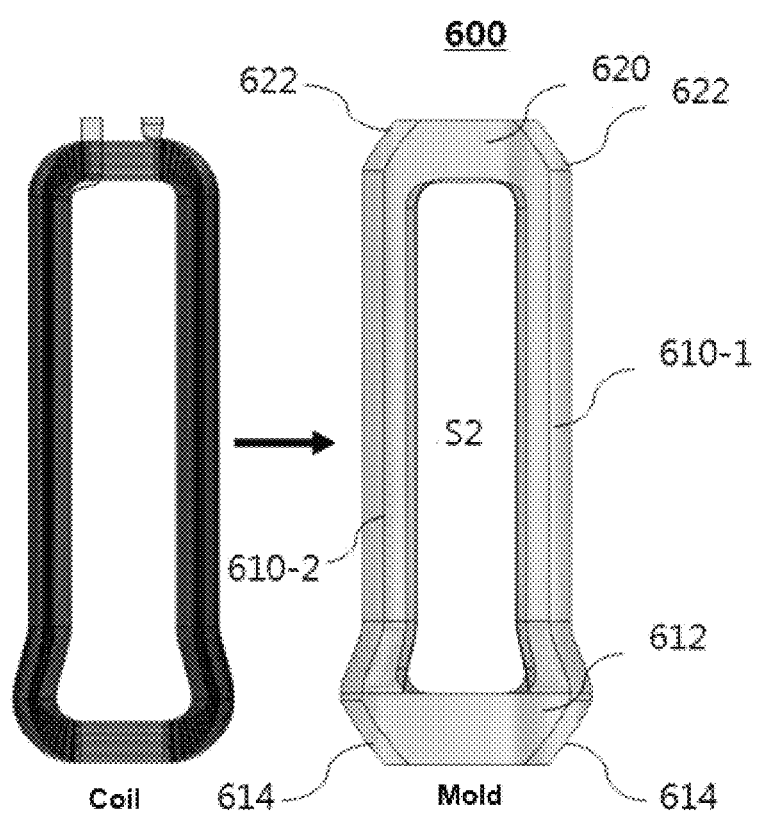
FIG. 6 is a diagram illustrating a manufacturing process of an individual outcoil structure according to the present embodiment.

FIG. 5 is a diagram illustrating a manufacturing process of an individual incoil structure according to the present embodiment and FIG. 6 is a diagram illustrating a manufacturing process of an individual outcoil structure according to the present embodiment.

Referring to FIGS. 5 and 6, the incoil structure and the outcoil structure are manufactured in a mold form through an injection process after winding coils.

At this time, the incoil structure and the outcoil structure are formed in an air-core winding structure to be coupled to each other and the structure thereof will be described below.

Figure 7:
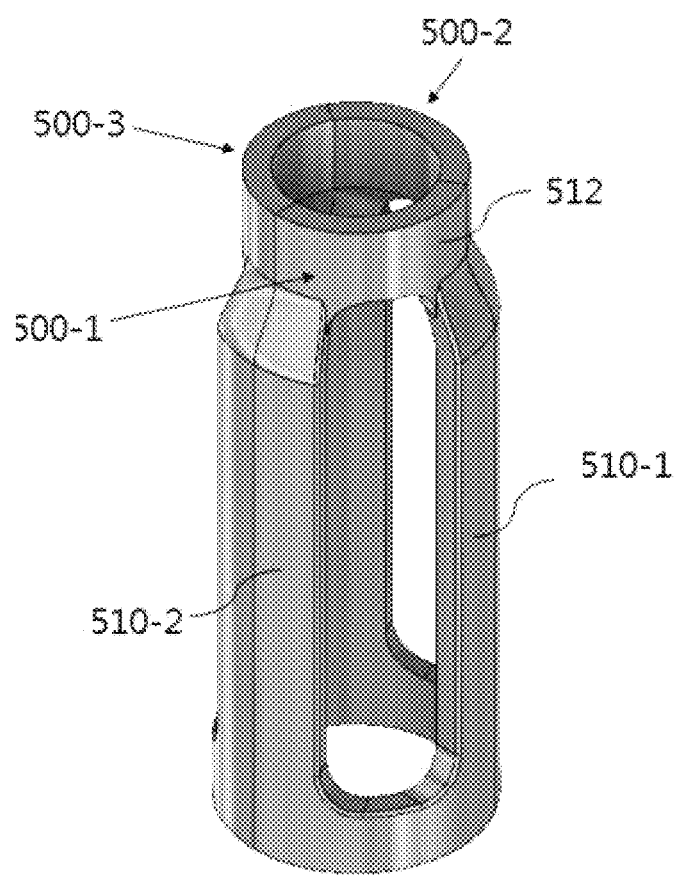
FIG. 7 is a diagram illustrating a plurality of incoil structures coupled to each other according to the present embodiment.

FIG. 7 is a diagram illustrating a plurality of incoil structures coupled to each other according to the present embodiment.

FIG. 7 illustrates a coil structure of a three-phase slotless motor, and includes three incoil structures 500-1 to 500-3.

Referring to FIGS. 5 and 7, an individual incoil structure 500 includes first coil sides 510-1 and 510-2 which face each other with a first space 51 interposed therebetween.

Further, a first end turn 512 bent in a first direction is formed on at least one end in a longitudinal direction of the first coil sides 510-1 and 510-2.

Preferably, the individual incoil structure has a cross section with a fan shape in a width direction. That is, the first coil sides 510-1 and 510-2 and the first end turn 512 have fan shapes in a width direction.

The first end turn 512 of the incoil structure has a radius smaller than the first coil sides 510-1 and 510-2 in a concentric direction.

Figure 8:
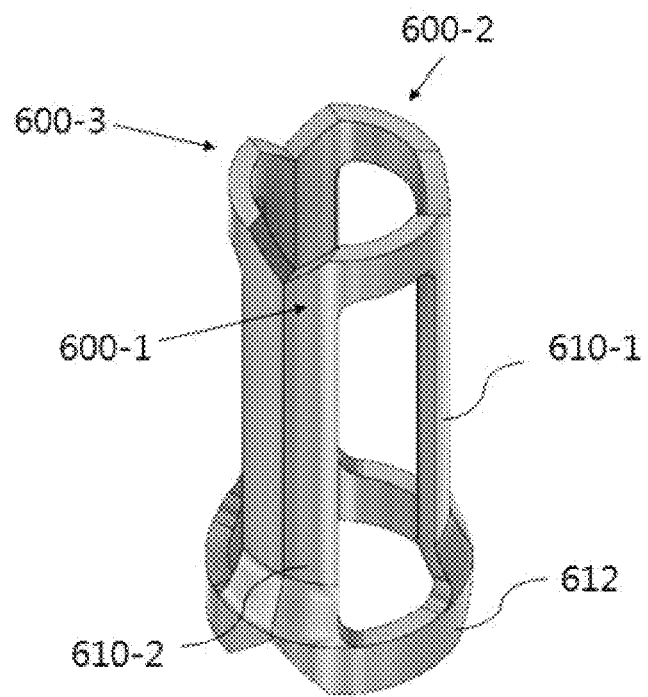
FIG. 8 is a diagram illustrating a plurality of outcoil structures coupled to each other according to the present embodiment.

FIG. 8 is a diagram illustrating a plurality of outcoil structures coupled to each other according to the present embodiment.

FIG. 8 illustrates three outcoil structures 600-1 to 600-3 provided in the three-phase slotless motor.

Referring to FIGS. 6 and 8, an individual outcoil structure includes second coil sides 610-1 and 610-2 which face each other with a second space S2 interposed therebetween.

Further, a second end turn 612 bent in a second direction is formed on at least one end in a longitudinal direction of the second coil sides 610-1 and 610-2.

Preferably, here, the second coil sides 610-1 and 610-2 and the second end turn 612 have a fan-shaped cross section in a width direction.

The second end turn 612 of the outcoil structure has a radius larger than the second coil sides 610-1 and 610-2 in a concentric direction.

Here, the first end turn 512 and the second end turn 612 have shapes bent in opposite directions to each other, and preferably, the first end turn 512 has a shape bent inward of the first coil sides 510 and the second end turn 612 has a shape bent outward of the second coil sides 610.

Figure 9:
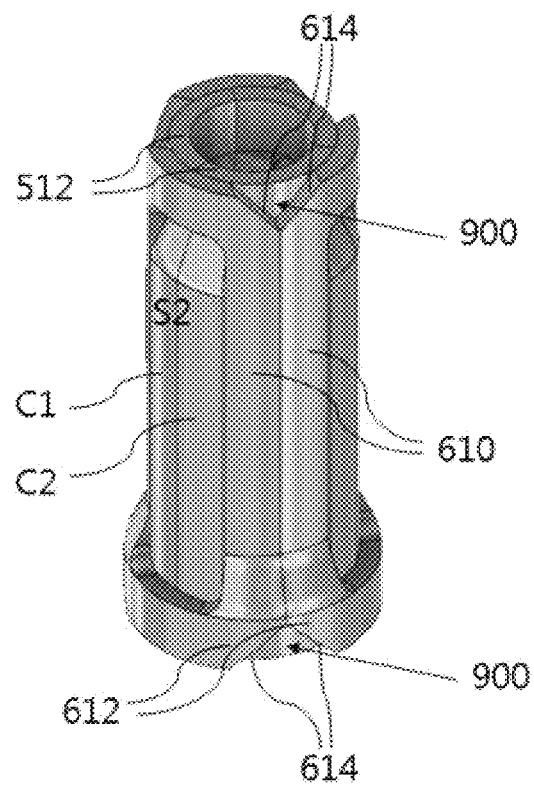
FIG. 9 is a diagram illustrating a coupling state of the incoil structure and the outcoil structure according to the present embodiment.
Figure 10:
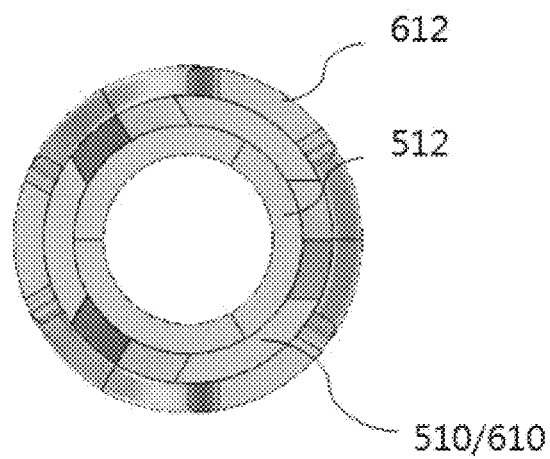
FIG. 10 is a diagram illustrating an upper cross section in coupling of the incoil structure and the outcoil structure.
Figure 11:
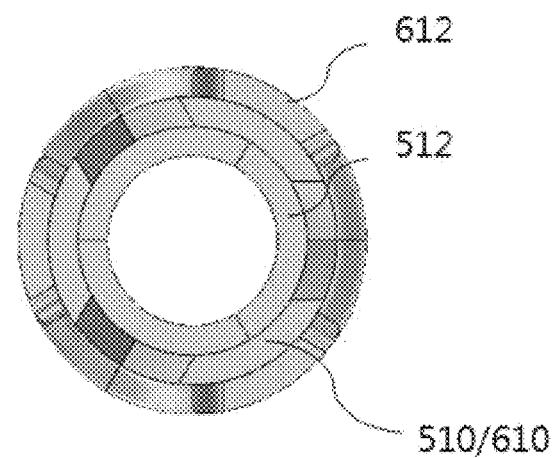
FIG. 11 is a diagram illustrating a lower cross section in coupling of the incoil structure and the outcoil structure.

FIG. 9 is a diagram illustrating a coupling state of the incoil structure and the outcoil structure according to the present embodiment, FIG. 10 is a diagram illustrating an upper cross section in coupling of the incoil structure and the outcoil structure, and FIG. 11 is a diagram illustrating a lower cross section in coupling of the incoil structure and the outcoil structure.

As illustrated in FIG. 9, for forming a circular winding structure, when an incoil assembly and an outcoil assembly are coupled to each other, the first coil sides 510 and the first end turn 512 of different incoil assemblies are in contact with each other to be disposed inside while a cross section forms a concentric circle.

The plurality of outcoil structures are arranged to surround the plurality of incoil structures in a state in which the second coil sides 610 of different outcoil assemblies are brought into contact with each other and a cross section forms a concentric circle.

Referring to FIG. 9, when the circular winding structure is formed, at least one of the first coil sides of the incoil assembly is disposed in the space S2 of the outcoil assembly.

In the case of the three-phase motor, a first coil side C1 of the first incoil assembly and at least one first coil side C2 of the second incoil assembly disposed adjacent to the first incoil assembly are disposed in the space S2 formed in the first outcoil assembly.

Preferably, the sum of the widths of C1 and C2 is the same as the width of the space S2.

In the case of a two-phase motor other than a three-phase motor, the numbers of the incoil assemblies and the outcoil assemblies may be provided in different numbers from FIG. 9, and in this case, at least one of the first coil sides of the incoil assembly may also be located in the space S2 of the outcoil assembly.

Referring to FIGS. 9 to 11, the first coil sides 510 and the second coil sides 610 have the same radius in the concentric direction, wherein an outer radius of the first end turn 512 bent inward is the same as inner radii of the first and second coil sides 510 and 610 and an inner radius of the second end turn 612 bent outward is formed the same as the outer radii of the first and second coil sides 510 and 610.

Through the structure, the first coil sides 510 of the incoil structure and the second coil sides 610 of the outcoil structure are formed with the same radii, so that an effective gap length is the same even in any place. As a result, since the effective gap length is constant, a possibility that the phase unbalance occurs is reduced, and while the structure is simplified in the slotless motor, the manufacturing property is improved.

Meanwhile, as illustrated in FIGS. 6 and 9, the second end turn 612 of the outcoil structure according to the embodiment has first inclined portions 614 having a symmetrical form at both ends.

As such, notches 900 are formed at adjacent positions of the first inclined portions 614 of the plurality of second end turns 612 at the time of coupling different outcoil structures by the first inclined portions 614 in the symmetrical form.

Further, at the other end facing the second end turn 612 of the outcoil structure, a third end turn 620 having the same radius as the second coil sides 610 is provided, and even at both ends of the third end turn 620, second inclined portions 622 may be formed.

Accordingly, a plurality of notches 900 is formed on the upper and lower sides when the plurality of incoil structures and outcoil structures are coupled to each other.

Figure 12:
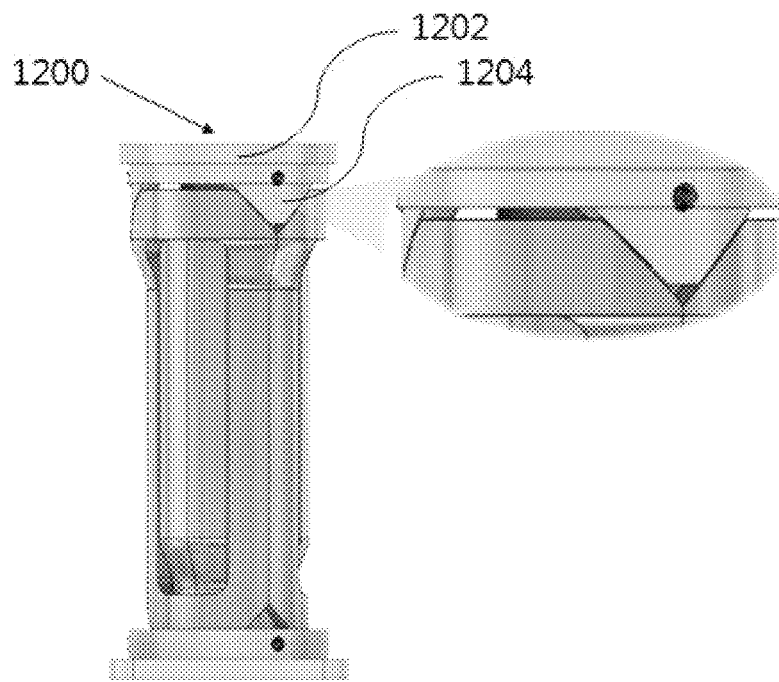
FIG. 12 is a diagram illustrating a coupling state of a coil assembly of a slotless motor and a housing according to a preferred embodiment of the present invention.

FIG. 12 is a diagram illustrating a coupling state of a coil assembly of a slotless motor and a housing according to a preferred embodiment of the present invention.

As illustrated in FIG. 12, a housing 1200 according to the present embodiment may be provided in at least one of the upper and lower portions of the coil assembly.

The housing 1200 may include a circular main body 1202 and a plurality of protrusions 1204 that are coupled with the plurality of notches 900 formed by the outcoil assembly on one side of the main body 1202.

In the present embodiment, in the slotless motor, the air-core winding structure is formed to provide the incoil assembly and the outcoil assembly in an injection process instead of winding the coils individually. The plurality of notches are formed through the inclined portions of both ends of the second end turn of the outcoil assembly, and the plurality of notches and the housing are coupled with each other to uniformly distribute the coils to the stator without using an adhesive and stably coupling the coils to the stator.

The embodiments of the present invention described above are disclosed for purposes of illustration, and it will be apparent to those skilled in the art that various modifications, additions, and substitutions are possible within the spirit and scope of the present invention and these modifications, changes, and additions should be considered as falling within the scope of the following claims.

What is claimed is:

1. A coil assembly of a slotless motor, comprising:
 a plurality of first coil structures which have two first coil sides facing each other with a first space interposed therebetween and having a fan-shaped cross section in a width direction and have a first end turn bent in a first direction on at least one end in a longitudinal direction of the two first coil sides; and
 a plurality of second coil structures which have two second coil sides facing each other with a second space interposed therebetween and having a fan-shaped cross section in a width direction and have a second end turn bent in a second direction on at least one end in a longitudinal direction of the two second coil sides, wherein the plurality of first coil structures and the plurality of second coil structures are coupled to each other to form a circular stator winding structure, wherein the second end turn of the plurality of second coil structures has inclined portions in a symmetrical form at both ends and when different second coil structures are coupled to each other to form the circular stator winding structure, a notch is formed by the inclined portions in the symmetrical form, wherein, after forming the circular stator winding structure, a housing is coupled to at least one of upper and lower portions of the plurality of second coil structures, and wherein the housing has a plurality of protrusions which are coupled to a plurality of notches formed by the plurality of second coil structures.

2. The coil assembly of the slotless motor of claim 1, wherein during coupling for forming the circular stator winding structure, first end turns of the plurality of first coil structures and second end turns of the plurality of second coil structures are disposed in opposite directions to each other.

3. The coil assembly of the slotless motor of claim 1, wherein during coupling for forming the circular stator winding structure, the plurality of first coil structures are located inside and the plurality of second coil structures are disposed at the outside of the plurality of first coil structures while surrounding the plurality of first coil structures.

4. The coil assembly of the slotless motor of claim 1, wherein the first coil sides and the second coil sides have the same radii in a concentric direction, wherein an outer radius of the first end turn is the same as inner radii of the first and second coil sides and an inner radius of the second end turn is formed the same as the outer radii of the first and second coil sides.

5. The coil assembly of the slotless motor of claim 1, wherein the plurality of first coil structures and second coil structures have coil mold structures.

6. The coil assembly of the slotless motor of claim 1, wherein at the other end facing the second end turn of the plurality of second coil structures, a third end turn having the same radius as the second coil sides is provided, second inclined portions in a symmetrical form are formed at both ends of the third end turn, and when different second coil structures are coupled to each other to form the circular winding structure, a notch is formed by the second inclined portions in the symmetrical form.

7. A slotless motor comprising the coil assembly according to claim 1.

8. A coil assembly housing of a slotless motor comprising:
a main body; and
a plurality of protrusions formed on one surface of the main body,
wherein the plurality of protrusions are coupled to a plurality of notches formed by coupling of a plurality of coil structures constituting the coil assembly of the slotless motor, and the coil assembly of the slotless motor includes a plurality of first coil structures which have two first coil sides facing each other with a first space interposed therebetween and having a fan-shaped cross section in a width direction and have a first end turn bent in a first direction on at least one end in a longitudinal direction of the two first coil sides and a plurality of second coil structures which have two second coil sides facing each other with a second space interposed therebetween and having a fan-shaped cross section in a width direction and have a second end turn bent in a second direction on at least one end in a longitudinal direction of the two second coil sides, wherein the plurality of first coil structures and the plurality of second coil structures are coupled to each other to form a circular stator winding structure.

* * * * *